Oct. 6, 1970   H. W. SAMO   3,531,893

MAGNETICALLY RESPONSIVE DOLL EYE ASSEMBLY

Filed Feb. 5, 1968

INVENTOR
HARVEY W. SAMO
BY
James F. Franklin
ATTORNEY

United States Patent Office 3,531,893
Patented Oct. 6, 1970

3,531,893
MAGNETICALLY RESPONSIVE DOLL EYE ASSEMBLY
Harvey W. Samo, Maplewood, N.J., assignor to Margon Corporation, Rahway, N.J., a corporation of New Jersey
Filed Feb. 5, 1968, Ser. No. 702,844
Int. Cl. A63h 3/38
U.S. Cl. 46—237                                    6 Claims

ABSTRACT OF THE DISCLOSURE

A magnetically responsive doll eye assembly in which an eye member pivotally movable between eye open and eye closed positions in a housing is made magnetically responsive to magnet bodies incorporated in the eye assembly and mounted within the housing.

---

This invention relates to doll eyes and more particularly to a magnetically responsive doll eye assembly.

The prime object of the invention is to provide a doll eye assembly for use in a flexible, plastic doll head having individual eye sockets to receive independent or individual eye assemblies, the doll eye assembly embodying a housing mountable in an eye socket of the doll head and an eye member pivotally mounted within the housing for eye opening and eye closing movements, the eye member when moved from an eye open to an eye closed position, or vice versa, being held or locked in such position by the interaction of magnet bodies incorporated in the eye assembly and mounted within its housing.

A further prime object of the invention is the provision of a doll eye assembly of the character referred to in which when movement of the doll eye member from an open toward a closed position or vice versa is initiated, as by an interposed act of a child, the doll eye member will move to its said position with a snap action and the doll eye will then be held or locked in such position by interaction of the magnetic bodies located in the housing of the assembly.

A still further prime object of the invention is the provision of a doll eye assembly of this character combined with an external magnet manually movable by a child in front of the individual doll mounted eye assemblies for moving either one or both of the eye members thereof between their open and closed positions to obtain any of a number of playful eye actions in response to the magnetic interaction between said external magnet and magnet bodies of the eye assemblies, such as effecting a controlled (slow or fast) sleeping or waking movement of the eyes, or a controlled winking movement (also slow or fast) imparted to either eye of the doll mounted assemblies.

To the accomplishment of the foregoing objects and such other objects as may hereinafter appear, the present invention encompasses the magnetically responsive doll eye assembly as disclosed herein and defined in the accompanying claims taken together with the following description and the appended drawings, in which:

FIG. 1 is a view of a doll head with which individual eye assemblies of the present invention are embodied, FIG. 1 depicting one of the actions, namely the imparting of a winking movement to one of the eye members that is producible in the playful use of the eye assemblies of the invention;

FIG. 2 is a longitudinal view with parts shown in section of a doll eye assembly of the invention taken in cross-section in the plane of the line 2—2 of FIG. 1, showing the same on an enlarged scale (with reference to the view of FIG. 1), this figure depicting the eye member of the eye assembly in open position and also showing the combination of the eye assembly with a manipulatable external magnet.

Figure 1:
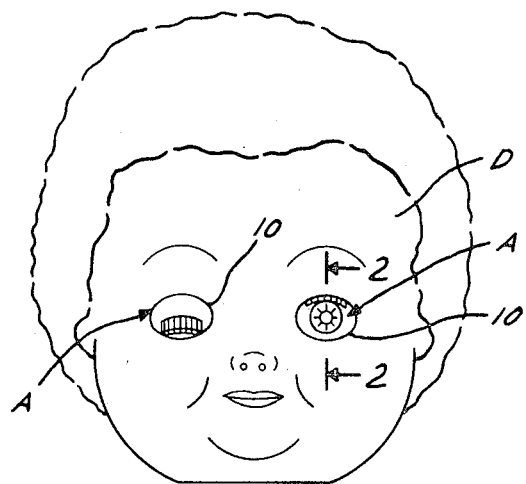

Referring now more in detail to the drawings, the eye assembly of the invention generally designated as A is of the type for use in a flexible, plastic doll head D having individual eye sockets 10, 10 formed to receive individual eye assemblies such as A as generally depicted in FIG. 1 of the drawings in the manner more particularly disclosed in the patent to Wolfe et al., No. 2,696,064, patented Dec. 7, 1954. As hereinafter set forth the assembling of the parts which define the individual eye assembly A is also similar to that disclosed in said Pat. No. 2,696,064.

Figure 2:
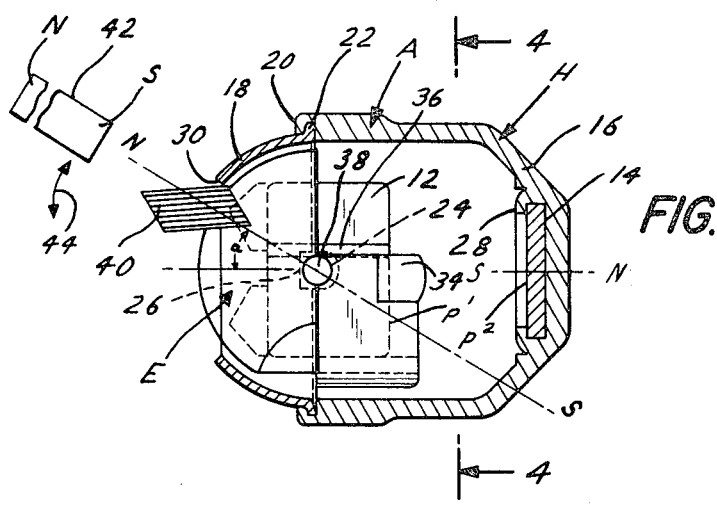
Figure 3:
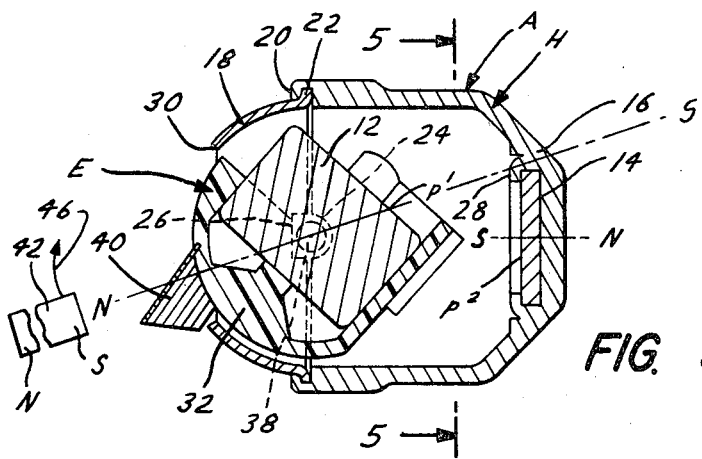
FIG. 3 is a view similar to that of FIG. 2 but showing all of the parts in cross-section, this figure showing the eye member in its closed position.

The doll eye assembly of the present invention is a magnetically responsive eye assembly and comprises a housing generally designated as H mountable, as above indicated, in each of the eye sockets 10, 10 of the doll head, an eye member E pivotally mounted within and at the front of said housing and movable therein between the eye open position shown in FIG. 2 and the eye closed position shown in FIG. 3, a first magnet body 12 fixedly carried by said eye member E and a second magnet body 14 fixed to said housing H and located at the rear thereof and behind said eye member E.

The housing H is preferably made in two parts and comprises a back cover 16 and a front cover 18 both made of a non-magnetic material, the back cover 16 being preferably a plastic component and the front cover being preferably a metallic component made of material such as brass. The front cover 18 after the eye assembly E is mounted in the housing is secured to the back cover by indenting the front peripheral edge 20 of the back cover over an annular flange 22 formed in the front cover. The back cover is formed with opposed bearing slots 24, 24 and the front cover is provided with cooperating ledge parts 26, 26 for a purpose to be referred to hereinafter. The magnet body 14 which comprises a flat circular member, is fixed to the rear end of the back cover 16 preferably by inturning thereagainst an annular edge 28 of the plastic material of the back cover. The front cover 18 is formed with the eye exposure opening 30.

Figure 4:
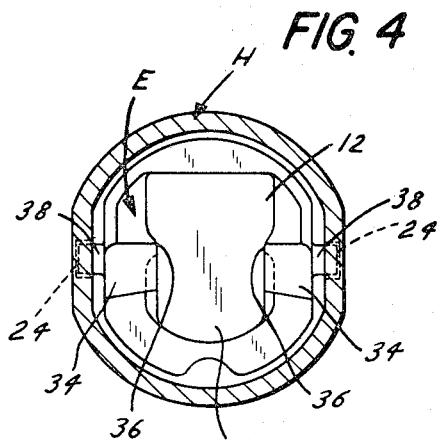
FIG. 4 is a view of the eye assembly shown in transverse section taken in the plane of the line 4—4 of FIG. 2.
Figure 5:
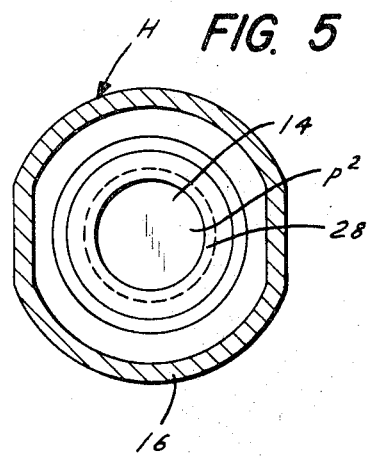
FIG. 5 is a view of the eye assembly shown in transverse section taken in the plane of the line 5—5 of FIG. 3.

The eye member E comprises a preferably all-plastic component embodying a lens part 32 which simulates the iris and pupil of the eye, the said eye member having a configuration as depicted in the drawings. The first magnet body 12 is inserted at the rear of the eye member E into the hollow thereof and is affixed thereto by indented opposed parts 34, 34 of the eye member fitted into grooves 36, 36 in the sides of the magnet body 12 as best shown in FIG. 4 of the drawings. The eye member E is also formed with opposed trunnions 38, 38 which in the assembling of the parts is received in the bearing slots 24, 24 and held therein by the ledges 26, 26, the structure and assembling of these parts being similar to that disclosed in FIGS. 4 to 6 of the said Wolfe et al. Pat. 2,696,064. The eye member E is also provided with a hard plastic eyelash member 40.

To carry out the principles of the present invention the magnet bodies 12 and 14 are magnetized in the direction of the longitudinal axis of the eye assembly, and the magnet bodies 12 and 14 are magnetized in opposite directions one with respect to the other, as indicated by the directional polarizing lines N–S and S–N in FIGS. 2 and 3 of the drawings, the adjacent facing poles $p'$ of the magnet body 12 and $p^2$ of the magnet body 14 being thereby of like and magnet-repelling polarities. In the preferred construction the first magnet 12 is magnetized in a direction at an angle to the longitudinal axis of the eye assembly equal to the angle $a$ (FIG. 2) and therefore substantially equal to one-half of the arc of movement of the eye member from its open to its closed positions. The second magnet body 14 is magnetized in the direction of the longitudinal axis of the eye assembly. Both of these directions are depicted in FIGS. 2 and 3 of the drawings.

The magnet body 12 and the magnet body 14 to accomplish the opposite directions of polarization thereof are separately magnetized prior to being assembled to the housing H. Thus the magnet body 12 affixed to the plastic component of the eye member E is first magnetized along the line N–S indicated therefor and the second magnet 14 which is affixed to the back cover 16 is separately magtized along the line S–N indicated therefor and then the eye member E is assembled to the back and front covers of the housing H in the manner hereinbefore described.

Associated for combination with this described magnetically responsive doll eye assembly I provide an external magnet 42 which may be in the form of a readily manipulatable bar magnet having the opposite poles (S and N) indicated in the drawings.

The eye assembly A of the invention and its association with the external magnet serve the following purposes in the many playful uses thereof by the child:

(1) The eye members E do not respond to any eye opening or eye closing movements by moving the doll between erect and prone positions; i.e. the eye members E are maintained normally in the eye open position as depicted in FIG. 2 of the drawings.

(2) This permits the child to bring about the closing of the eye as well as the opening of the eye by a finger manipulation of the eyelash 40 of the eye assembly. The child therefore may put the doll to sleep or awaken the doll, in any position thereof, by tenderly inducing the sleeping or waking action by this manipulation. As constructed, all the child may do is to gently touch the lash 40 of the eye member to induce or initiate either the sleeping or waking movement of the eye whereupon the interaction between the like and magnet-repelling poles $p'$ and $p^2$ of the magnet bodies causes the eye member E to complete its movement with a snap action and thereupon the doll eye will be held or locked in its movement position by the interaction of the magnetic bodies 12 and 14. Thus a snap movement of the eye member from its open position shown in FIG. 2 and its closed position shown in FIG. 3 (and vice versa) is obtained and the eye member is magnetically held or locked in its thus attained position.

(3) The use of a separate magnet 42 in combination with this eye assembly enables a number of other playful eye actions to take place in response to the magnetic interaction between said external magnet and the magnet body which is attached to the eye member, such as a controlled winking movement, slow or fast, imparted to either eye of the doll mounted assemblies or a simultaneous movement (also slow or fast) of both eye assemblies of the doll. With the rod magnet 42 positioned as shown in FIGS. 2 and 3, the polarities between the external magnet and the magnet body 12 being in opposite relation, movement of the bar magnet 42 in the direction indicated by the arrow 44 (FIG. 2) will effect the movement of the eye member E from the open to the closed position and the reverse movement of the bar magnet as indicated by the arrow 46 (FIG. 3) will effect the opening movement of the eye member E. When the external bar magnet 42 is positioned to move adjacent the eye shown to the left of FIG. 1, a winking movement of the eye as there depicted may be obtained. Similarly when the bar magnet is moved adjacent the other eye, a winking movement of that eye may be obtained. Where the bar magnet is positioned medially of the eyes of the doll, both eyes will be simultaneously moved between their open and closed positions by the described movements of the bar magnet. When the bar magnet is reversed in position so that its pole N is adjacent the N pole of the magnet body 12, thereby introducing repelling magnet poles, corresponding positioning of the bar magnet will effect rapid movement responses of the doll eye. Also an internal magnet can be used on the inside of the doll head and behind the back of the eye assembly, for actuating the movement of one or both eyes in the same manner as a manually controlled external magnet does. Such an internal magnet can be moved from a position above the eye assembly to a position below same by any mechanical means, independent or associated with other mechanical actions of the doll, such as the lifting of the doll's arm, or by a linkage from a rotating device, walking or talking mechanism.

The making and assembly of the doll eye assembly of the present invention and the structure, operation and uses of a doll employing the separable and independent eye assemblies of the invention will in the main be fully apparent from the above detailed description. It will be further apparent that changes may be made in the eye assembly of the present invention as well as its combination with an external magnet without departing from the spirit of the invention defined in the following claims.

I claim:

1. A magnetically responsive doll eye assembly for use in a flexible, plastic doll head having individual eye sockets to receive individual eye assemblies, said eye assemblies comprising a housing mountable in an eye socket of the doll head, an eye member pivotally mounted within and at the front of said housing and movable therein between eye open and eye closed positions, a first magnet body fixedly carried by said eye member, a second magnet body fixed to said housing and located at the rear thereof and behind said eye member, said first magnet body and said second magnet body being permanently magnetized in the direction of the longitudinal axis of the eye assembly, and being magnetized in opposite directions one with respect to the other, the adjacent facing poles of said magnet bodies being thereby of like and magnet-repelling polarities, whereby the eye member when moved to its eye open or eye closed position is locked in such position by the magnetic interaction of said magnet bodies.

2. The magnetically responsive doll eye assembly of claim 1 in which the first magnet body is magnetized in a direction at an angle to the longitudinal axis of the eye assembly substantially equal to one-half of the arc of movement of the eye member from its open to its closed positions, and the second magnet body is magnetized in the direction of the said longitudinal axis.

3. The magnetically responsive doll eye assembly of claim 1 in which the housing comprises a back cover and a front cover both made of a non-magnetic material, the second magnet body being fixedly located at the rear of the back cover, and the front cover attached to the rear cover being formed with an eye exposure opening.

4. The magnetically responsive doll eye assembly of claim 1 in combination with an external magnet manually movable in front of the eye assembly for moving the eye member between its open and closed positions in response to the magnetic interaction between said external magnet and the first magnet body of the eye assembly.

5. The magnetically responsive doll eye assembly of claim 3 in which the eye member comprises an all-plastic eye component, said eye component being provided with a lash member, the engagement of the lash member with the top and bottom edges of the eye exposure opening determining the opened and closed stop positions of the eye member.

6. The magnetically responsive doll eye assembly of claim 1 in which the said first and second magnet bodies, magnetized in opposite directions one with respect to the other, are separately magnetized prior to being assembled to the said housing.

References Cited

UNITED STATES PATENTS 3,423,874   1/1969   Bonanno et al. _____ 46—169

ROBERT PESHOCK, Primary Examiner

R. F. CUTTING, Assistant Examiner

U.S. Cl. X.R.

46—189, 239